United States Patent
Olson et al.

(10) Patent No.: US 8,521,421 B2
(45) Date of Patent: Aug. 27, 2013

(54) GPS NAVIGATOR

(76) Inventors: Dwight C. Olson, San Diego, CA (US); Gary M. Nath, Alexandria, VA (US)

( * ) Notice: Subject to any disclaimer, the term of this patent is extended or adjusted under 35 U.S.C. 154(b) by 0 days.

(21) Appl. No.: 13/323,080

(22) Filed: Dec. 12, 2011

(65) Prior Publication Data

US 2012/0095680 A1    Apr. 19, 2012

Related U.S. Application Data

(63) Continuation of application No. 13/012,415, filed on Jan. 24, 2011, now Pat. No. 8,099,236, which is a continuation-in-part of application No. 12/818,947, filed on Jun. 18, 2010, now abandoned.

(51) Int. Cl.
    *G01C 21/32*    (2006.01)

(52) U.S. Cl.
    USPC ........... 701/426; 701/418; 701/420; 701/422; 701/424; 701/425; 701/438; 701/454; 701/457; 701/467

(58) Field of Classification Search
    USPC ................. 701/426, 418, 420, 422, 424, 425, 701/438, 454, 457, 467
    See application file for complete search history.

(56) References Cited

U.S. PATENT DOCUMENTS

| | | | |
|---|---|---|---|
| 6,333,702 B1 * | 12/2001 | Hiyokawa et al. | 340/995.21 |
| 6,401,034 B1 | 6/2002 | Kaplan et al. | |
| 6,456,931 B1 | 9/2002 | Polidi et al. | |
| 6,480,783 B1 | 11/2002 | Myr | |
| 6,505,114 B2 | 1/2003 | Luciani | |
| 6,539,300 B2 | 3/2003 | Myr | |
| 6,587,835 B1 | 7/2003 | Treyz et al. | |
| 6,594,576 B2 | 7/2003 | Fan et al. | |
| 6,615,130 B2 | 9/2003 | Myr | |
| 6,681,175 B2 | 1/2004 | MacPhail et al. | |
| 6,853,915 B2 | 2/2005 | Hubschneider et al. | |
| 6,943,723 B2 | 9/2005 | Kim et al. | |
| 6,968,180 B2 | 11/2005 | Kirby et al. | |
| 7,096,115 B1 | 8/2006 | Groth et al. | |
| 7,124,023 B2 | 10/2006 | Peeters | |
| 7,343,317 B2 | 3/2008 | Jokinen et al. | |

(Continued)

OTHER PUBLICATIONS

Bruni, Frank, "Where to Eat? Ask your iPhone", The New York Times, Jul. 16, 2008, retrieved online on Jan. 13, 2011, http://www.nytimes.com/2008/07/16/dining/16note.html.

(Continued)

*Primary Examiner* — James Trammell
*Assistant Examiner* — Jerrah Edwards
(74) *Attorney, Agent, or Firm* — Nath, Goldberg & Meyer; Jerald L. Meyer; Gary M. Nath

(57) ABSTRACT

Disclosed is a method and system for identifying a location of interest between a user and an identified endpoint and creating a user preference profile containing at least one location of interest to the user. A sampling bandwidth is designated based on current distance to the identified endpoint, wherein the navigation unit dynamically expands the sampling bandwidth as the user approaches within a predetermined distance of the endpoint. At least one user preference profile location of interest is selected that is within the sampling bandwidth that is between the user and the indentified endpoint. A sampling vector is computed for the at least one location of interest within the sampling bandwidth, and the user is alerted to the sampling vector for the at least one location of interest within the sampling bandwidth.

22 Claims, 8 Drawing Sheets

(56) References Cited

U.S. PATENT DOCUMENTS

| | | |
|---|---|---|
| 7,366,606 B2 | 4/2008 | Uyeki |
| 7,439,878 B2 | 10/2008 | Kato et al. |
| 7,480,560 B2 | 1/2009 | Boll |
| 7,551,927 B2 | 6/2009 | McKenna et al. |
| 7,577,244 B2 | 8/2009 | Taschereau |
| 7,593,740 B2 | 9/2009 | Crowley et al. |
| 7,636,574 B2 | 12/2009 | Poosala |
| 7,756,534 B2 | 7/2010 | Anupam et al. |
| 7,769,633 B2 | 8/2010 | Jokinen et al. |
| 2005/0075782 A1 | 4/2005 | Torgunrud |
| 2005/0102102 A1 | 5/2005 | Linn |
| 2007/0005230 A1 | 1/2007 | Sera |
| 2008/0208462 A1 | 8/2008 | Tanaka |
| 2009/0011740 A1 | 1/2009 | Aggarwal et al. |
| 2009/0011744 A1 | 1/2009 | Daley et al. |
| 2009/0125321 A1 | 5/2009 | Charlebois et al. |
| 2010/0057347 A1* | 3/2010 | Sugiyama et al. ............ 701/204 |
| 2011/0118965 A1 | 5/2011 | Aben et al. |

OTHER PUBLICATIONS

AppZorz: Innovation in Mobile & Social Apps, "YummiPhone: The best way to find a place to eat!", retrieved online on Aug. 16, 2010, http://appzorz.com/.

"IBM, Caltrans and UC Berkeley Aim to Help Commuters Avoid Congested Roadways Before their Trip Begins," IBM Press Room, (Apr. 13, 2011), pp. 1-3, http:/www-03.ibm.com/press/us/en/pressrelease/34261.wss.

"IBM shows off Smarter Traveler traffic prediction tool,"Fix Twit, (Apr. 13, 2011), pp. 1-4, http://www.fixtwit.com/2011/04/13.ibm-shows-off-smarter-traveler-traffic-prediction-tool/.

* cited by examiner

GPS NAVIGATOR

RELATED APPLICATION

This application is a Continuation of U.S. patent application Ser. No. 13/012,415, with a filing date of Jan. 24, 2011, which is a Continuation in Part of U.S. patent application Ser. No. 12/818,947, with a filing date of Jun. 18, 2010, both of which are hereby incorporated by reference in their entirety.

BACKGROUND OF THE INVENTION

Field of the Invention

The present subject matter relates generally to navigating a motor vehicle in a route, and more specifically to identifying at least one location of interest between a user and an identified endpoint.

SUMMARY OF THE INVENTION

The present subject matter provides a system and method for identifying at least one location of interest between a user and an identified endpoint. According to one aspect, the subject matter includes identifying a location of interest between a user and an identified endpoint and computing at least one reference vector based on current positional information, current velocity information, and the identified endpoint. A sampling bandwidth is designated based on at least one of current velocity information, current positional information, and current distance to the identified endpoint. One or more locations of interest between the user and the indentified endpoint are identified within the sampling bandwidth. A sampling vector is calculated for at least one of the one or more locations of interest within the sampling bandwidth, and the user is alerted to the sampling vector for the at least one location of interest within the sampling bandwidth. A sampling vector may be displayed with a first visual object of a first type if it has a magnitude within a first predetermined magnitude of the reference vector magnitude, and may be displayed with a second visual object of a second type if it has a magnitude within a second predetermined magnitude of the reference vector magnitude, which may have a different color than the object of the first type. In certain instances, the sampling vector is only identified to the user if it is within a predetermined magnitude of the reference vector magnitude.

According to a further aspect of the subject matter, positive velocities are associated with a first group of sampling vectors in a same traffic direction as the user vehicle in two-way traffic and negative velocities are associated with a second group of sampling vectors in an opposite traffic direction as the user vehicle in the two-way traffic. In this aspect of the subject matter, the current positional information includes positive positions associated with the first group of the sampling vectors and negative positions associated with the second group of the sampling vectors, and the computation of the sampling vector by the navigation unit is based upon at least one of the current velocity information and the current positional information and excludes the negative velocities and the negative positions.

In another aspect of the subject matter, at least one location of interest is selected from a database of user preferences. Alternatively, at least one location of interest is selected from a list of previous locations of interest chosen by the user. Locations of interest may also be selected from the group consisting of locations of interest previously selected within a predetermined time period, locations of interest previously selected from a similar geographic region, and locations of interest selected by another user having a profile similar to the current user. In still other embodiments, locations of interest that are obstructed due to traffic, construction, weather, or road hazards are excluded.

Yet another aspect of the subject matter provides a system and method for identifying a location of interest between a user and an identified endpoint that includes receiving a computed reference vector based on current positional information, current velocity information, and an identified endpoint. A sampling bandwidth is designated based on at least one of current velocity information, current positional information, and current distance to the identified endpoint. A signal is received that includes information identifying one or more locations of interest within the sampling bandwidth that are between the user and the indentified endpoint. The system receives a computed sampling vector for at least one of the one or more locations of interest within the sampling bandwidth, and alerts the user to the sampling vector for the at least one location of interest within the sampling bandwidth.

According to a further aspect of the subject matter, a navigation unit connected to a motor vehicle contains a non-transitory computer-readable medium that stores data for implementing identification of a location of interest between a user and an identified endpoint and computation of at least one reference vector based on current positional information, current velocity information, and an identified endpoint. A sampling bandwidth is designated based on at least one of current velocity information, current positional information, and current distance to the identified endpoint. One or more locations of interest between the user and the indentified endpoint are identified within the sampling bandwidth. A sampling vector is calculated for at least one of the one or more locations of interest within the sampling bandwidth, and the user is alerted to the sampling vector for the at least one location of interest within the sampling bandwidth. A sampling vector may be displayed with a first visual object of a first type if it has a magnitude within a first predetermined magnitude of the reference vector magnitude, and may be displayed with a second visual object of a second type if it has a magnitude within a second predetermined magnitude of the reference vector magnitude, which may have a different color than the object of the first type. In certain instances, the sampling vector is only identified to the user if it is within a predetermined magnitude of the reference vector magnitude.

According to a further aspect of the subject matter, a device for navigating a motor vehicle includes a non-transitory computer-readable medium that stores data for implementing receiving a computed reference vector based on current positional information, current velocity information, and an identified endpoint. A sampling bandwidth is designated based on at least one of current velocity information, current positional information, and current distance to the identified endpoint. A signal is received that includes information identifying one or more locations of interest within the sampling bandwidth that are between the user and the indentified endpoint. The system receives a computed sampling vector for at least one of the one or more locations of interest within the sampling bandwidth, and alerts the user to the sampling vector for the at least one location of interest within the sampling bandwidth.

In these and other embodiments, the subject matter of the present application provides a vector from a present position of a user to one or more locations of interest between an identified endpoint and the user, thereby reducing the burden upon the user when traveling at high speeds on unfamiliar routes. The one or more locations of interest are communicated to the user and displayed on a screen featuring a digital map of the relevant region and/or identified via audio instructions.

In certain exemplary embodiments, travel time between two road intersections A and B is the sum of travel times for all sections of roads connecting A and B on the shortest route either by the minimal time criterion, or by some other criterion. Then in order to be able to compute a travel time between two positions on a map, one must be able to determine travel times for all sections of roads connecting those positions, or road intersections close to them. In the standard solution (an autonomous or stand-alone on-vehicle application), a route is computed by a mathematical optimization algorithm while travel times are computed as distances divided by maximal allowed speeds. While being simple, such solutions have an obvious shortcoming in that they do not take into account the real conditions on the roads and therefore can serve only as a guidance suggestion. Obviously, a true real time system should collect, store and make use of the following kinds of data:

1) Temporary changes in road conditions known in advance like closed roads under construction, traffic reroutes, etc.;

2) Regular predictable changes like everyday slowdowns in rush hours;

3) Sudden unpredictable changes such traffic accidents, traffic congestion due to sudden and drastic changes in traffic arrangements because of visiting dignitaries, etc.

Initially, the travel time is theoretical travel time but as the time goes by and observational data are being collected and processed, it is replaced by empirical travel time reflecting realistic travel conditions, and on particular occasions by current travel times, which reflect sudden and unpredictable changes in traffic conditions. Those travel times are being measured and periodically broadcasted by the signal transceiver to end-users where they are entered into the databases of the on-vehicle navigation units for future use.

On receiving an identified end point from a user, the navigation system applies an optimization procedure for computing a vector to at least one location of interest between a user and an identified endpoint. Thereafter, the vector is communicated to the user either visually on a computer map, or audibly through a sequence of voice instructions.

BRIEF DESCRIPTION OF THE DRAWINGS

The above and other aspects of the subject matter including various embodiments thereof is presented with reference to the accompanying drawings, the description not meaning to be considered limiting in any matter, wherein.

TERMS IN USE

Figure 1:
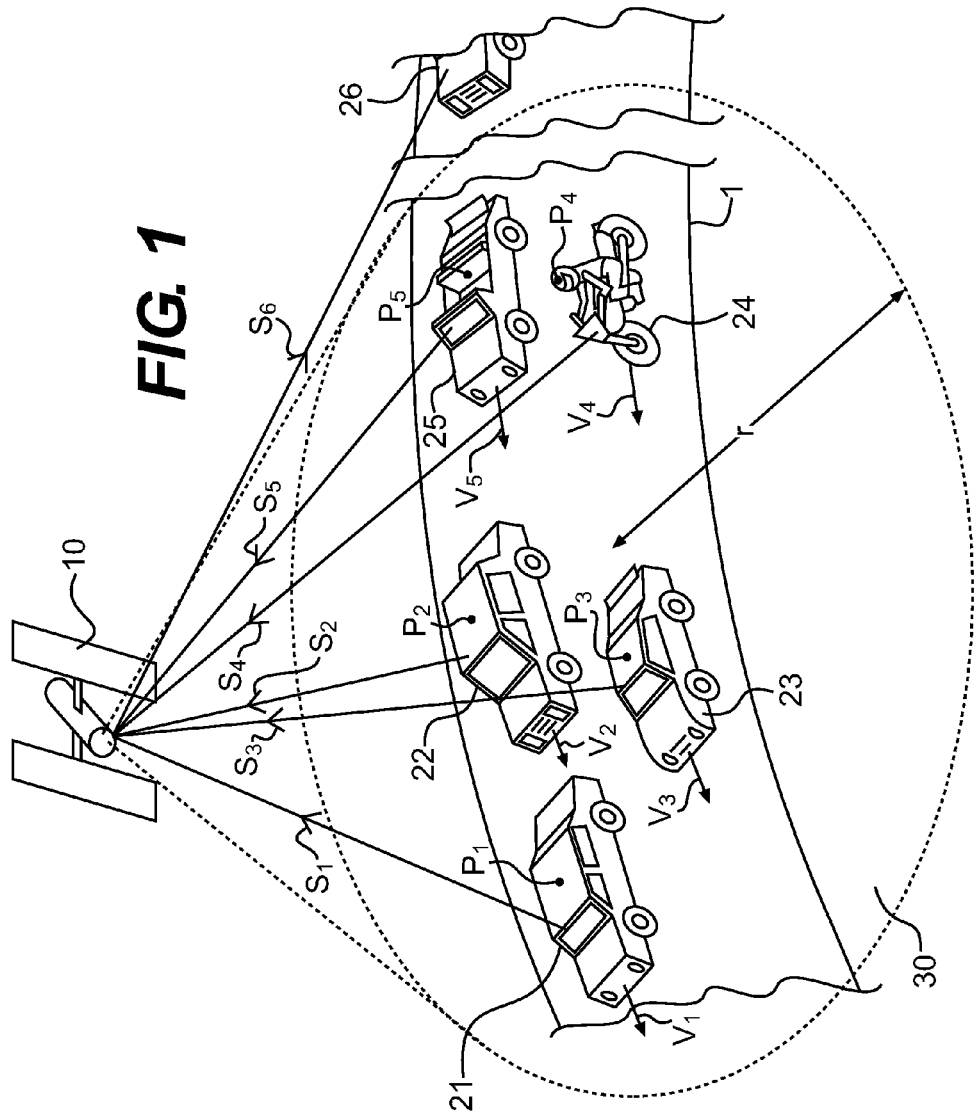
FIG. 1 shows a navigation system for a motor vehicle with reference to current traffic conditions in accordance with the subject matter.

The terms used in this application may be understood as follows:

(1) A transceiver is generally understood as a combination transmitter and receiver in a single unit. In this application, the signal transceiver can be a satellite, an aircraft, or a signal control station either on the ground or in the air, which includes a server unit with analogue/digital link to a navigation unit.

(2) A navigation unit is generally understood as a unit giving directions to other locations along roads for a user. In this application, the navigation unit may be equipped with a Global Positioning System (GPS) module, a Radio Frequency (RF) transmitter, or any other kinds of wired or wireless signaling module, including a wired/wireless internet module. For example, the navigation unit can be an independent navigation device, a mobile telephone or a mobile internet device such as a "Droid®" type mobile unit. The Droid (WCDMA/GSM version: Motorola Milestone) is an Internet and multimedia enabled smart phone designed by Motorola, which runs Google's Android operating system. The brand name Droid is a trademark of Lucas Film Ltd. licensed to Verizon Wireless.

(3) The Global Positioning System (GPS) is a space-based global navigation satellite system that provides reliable location and time information in all weather and at all times and anywhere on or near the Earth where there is an unobstructed line of sight to four or more GPS satellites.

DETAILED DESCRIPTION OF THE INVENTION

A goal of the present subject matter is to provide a real time travel navigation system capable of handling a driver's request for a shortest route to any destination. Another goal of the present subject matter is to identify at least one location of interest between a user and an identified endpoint. At any point of the journey the user can enter a request for alternative route and will receive an updated route reflecting the real time traffic situation directly on his display panel. The information will also be updated by visual and audio instructions, and the user's position will be displayed dynamically on the display navigation unit. Another goal is to provide the user with a tool for strategic trip planning. By entering alternate times for future trips and comparing their travel time estimates for the same destination, the user receives an option to select a trip proposal ideally suited for his/her needs. The navigation system also enables the user, manually or verbally, to update and customize his information database and adapt it to his/her personal needs and requirements.

The figures are diagrammatic and not drawn to scale. In the figures, elements which correspond to elements already described have the same reference numerals or characters.

FIG. 1 shows a navigation system for a motor vehicle with reference to current traffic conditions in accordance with the subject matter. On a road 1, sampling vehicles 21-25 are running with different velocities V1-V5, respectively, which are being followed by a user vehicle 26. The term "sampling vehicles" borrowed from Statistics does not mean that the vehicles are picked at random, but only that they do not travel on a predetermined path. For example, sampling vehicles 21-25 may include taxis, police cars or any other vehicles equipped with reporting devices. Carried by each of the sampling vehicles 21-25 and the user vehicle 26 is a navigation unit (not shown) in which a Global Positioning System (GPS) module, a Radio Frequency (RF) transmitter, or any other kind of wireless signaling module is installed. For example, the navigation unit can be an independent navigation device, a mobile telephone or a mobile internet device. A mobile internet device such as a "Droid®" type phone installed with an application that enables the user to find out the GPS position every x units of time and calculate the direction and/or speed can be the navigation unit according to the present subject matter. Each navigation unit in the vehicle 21-26 communicates with a signal transceiver 10 by trading signals S1-S6 therebetween. The signal transceiver 10 can be a satellite, an aircraft, or a signal control station either on the ground or in the air, including a wired/wireless internet module. In the case that a mobile internet device is used as the navigation unit, an internet server such as a management zone server can make an analog/digital link to a mobile internet device through wired/wireless internet communication.

The signal transceiver 10 determines a specific area 30 in a route to a destination desired by a driver of the user vehicle 26 and defines the sampling vehicles 21-25. Here, the specific area 30 can be defined by its radius R, or a sampling block (not shown) having a predetermined length along a route on which the sampling vehicles 21-25 are. Alternatively, the specific area 30 can at least one Universal Transverse Mercator (UTM) zone in a GPS navigation route between a starting (or current) point and an ending point, which is well defined in the art as a standard unit in the navigation route.

It appears practically impossible to collect, store and update information on all sections of roads even in a moderately large area where the numbers may run into hundreds of thousands or even millions, so the present subject matter proposes a division of all roads in a given geographical area into two basic road categories: Category A comprising of all highways; and Category B comprising all roads not in Category A. A more sophisticated division could be done by a more complex classification algorithm that performs classification based on type, maximum allowed speed, road length, road width, average traffic volume, registered average traffic volume (if available). Such an algorithm will have an obvious advantage of being able to perform automatic classification. All the databases in the sampling vehicles 21-25 and user vehicle 26 are updated from the signal transceiver 10 on a regular basis. These updates are done for both statistical (empirical) travel times and current travel times. It is logical while planning a route to use different travel times in different locations, in particular, to use current travel times in the vicinity of the present position of the user vehicle 26, and at the same time to use statistical travel times elsewhere.

The signal transceiver 10 receives signals S1-S5 from the sampling vehicles 21-25 that include their velocity information V1-V5 and/or their positional information P1-P5, and forwards the signals S1-S5 to the navigation unit mounted on the motor vehicle 26. Then, the navigation unit computes the received velocity information data V1-V5 and P1-P5 to yield a reference value, which is a number proportional to the incident traffic flow of the sampling vehicles 21-25 at a specific time point. When obtaining and/or computing the velocity information V1-V5 and/or the positional information P1-P5, the information associated with the opposite traffic can be excluded. For example, if the user vehicle 26 runs along a freeway with two-way traffic, the velocity information or the positional information regarding the opposite traffic will not be counted for deciding the optimal route.

The reference value is then compared with a predetermined value representing a normal traffic flow, which is determined based on the statistical data stored in the navigation unit. If the reference value is smaller than the predetermined value, the navigation unit recognizes it as a traffic incident in the route and issues a warning. For example, if the present traffic flow in the area of consideration, in which the sampling vehicles 21-25 run, is calculated as 5.6 based on the real time data, then the reference value of the area is 5.6. Then, this reference value is compared to the numerical value that indicates a normal traffic flow of the area, i.e., the predetermined value, 6.7, which is stored in the navigation unit. Since the reference value 5.6 is smaller than the predetermined value 6.7, the navigation unit may conclude that a traffic incident occurred in the area and issues a warning. The way of issuing the warning can be a visual symbol, an alarming sound, a vibration, a voice notification, or any combination thereof.

The sampling vehicles 21-25 can be three or more vehicles, whose velocity information V1-V5 and positional information P1-P5 may be in the form of velocity vectors and positional vectors, respectively.

The traffic incident can be, but not limited to, one of the following: 1) Temporary changes in road conditions known in advance, like closed roads under construction, traffic reroutes, etc.; 2) Regular predictable changes, like everyday slowdowns in rush hours; and 3) Sudden unpredictable changes, such traffic accidents, traffic congestion due to sudden and drastic changes in traffic arrangements because of visiting dignitaries, etc.

Optionally, the current traffic flow of an area ahead of the user vehicle along the desired route may not be considered or calculated if an estimated time for the user vehicle to arrive at the area is long enough that the current traffic flow at the area is expected not to be maintained by the time the vehicle arrives at the area. For example, consider a situation where the user vehicle is running 50 miles ahead of an area in the desired route, at a velocity of 50 miles/hour. If the navigation unit becomes aware that a traffic incident has happened and the calculation shows that the estimated time for clearing the incident about 30 minutes, then the navigation unit may continue with the originally suggested route, rather than suggesting an alternative route, because by the time the user vehicle arrives at the area in consideration the traffic flow will be restored to normal. For this function, the navigation unit can simply divide the desired route into a plurality of road segments without calculating the estimated arriving time to the incident area. For example, a first road segment is set for 0-5 miles ahead of the user vehicle; a second road segment is set for 5-10 miles; a third road segment is set for 10-15 miles; and so on. Based on this simplified division of the road, the unit can provide the driver with traffic information associated only with several nearest road segments while tentatively ignoring information on the farther segments.

Alternatively, the navigation unit can initially calculate the optimal route based on the statistical traffic data and/or the current time traffic data in association with the route, and then recalculate to reflect only the current time traffic data of the nearest road segments, e.g., segments for 0-15 miles, from the moving user vehicle.

Travel speeds along roads of various types can be obtained from the maximum allowed travel speed and by multiplying it by corresponding speed coefficients, so that traveling along any particular road is assumed to be done with a speed pertinent to the type of that road. The resulting speeds will be called the theoretical speeds, and the corresponding coefficients will be stored in a database in advance and provided on request. However, theoretical speeds are relevant only to ideal cases and will be probably never utilized except between midnight and early hours in the morning and even then under particularly favorably conditions. There are many reasons for this such as traffic congestion in rush hours, less than perfect road conditions, unfavorable weather conditions, falling trees, public gatherings, demonstrations, and a host of other factors that are difficult to enumerate. For route planning, the present navigation system uses empirical statistical travel times instead of theoretical travel times. These empirical travel times are preserved in the form of empirical speed coefficients by which the maximum allowed speeds should be multiplied.

Also it should be appreciated that a traffic incident can be calculated lane by lane so that the driver of the user vehicle can be prepared before arriving at the traffic of the lane in consideration. For this function, the navigation unit first identifies what kind of incident is that: for example, a simple slow-down, a serious car accident, a road construction, a temporary stop of a car, etc. This identification can be done by analyzing the pattern of the traffic flow in the lane in consideration. For example, in the case of a car accident or a road construction, there will be no flow in the lane and every sampling vehicle must switch to the next lane. On the other hand, in the case of a simple slowdown, there will be slow traffic flow in the lane, and switching to the next lane will occasionally occur. Based on the identified type of the incident, the navigation unit can issuing a warning whether to stay put in the current lane, or to simply slow down, or to switch to the next lane, among others. Optionally, when identifying the type of traffic incident, the navigation unit can simply reflect only the traffic flow in the nearest segments, e.g., 0-15 miles.

The navigation system can be operated using both digital and analog systems. Also, the system can additionally include an automatic braking system that enables the user vehicle to automatically stop when it detects very slow traffic or stopped vehicles within a very short range in the same lane ahead of the vehicle. This automatic braking system can brake the vehicle quicker than the human reaction, to thereby prevent traffic accidents caused by unexpected traffic conditions ahead of the vehicle.

Figure 2:
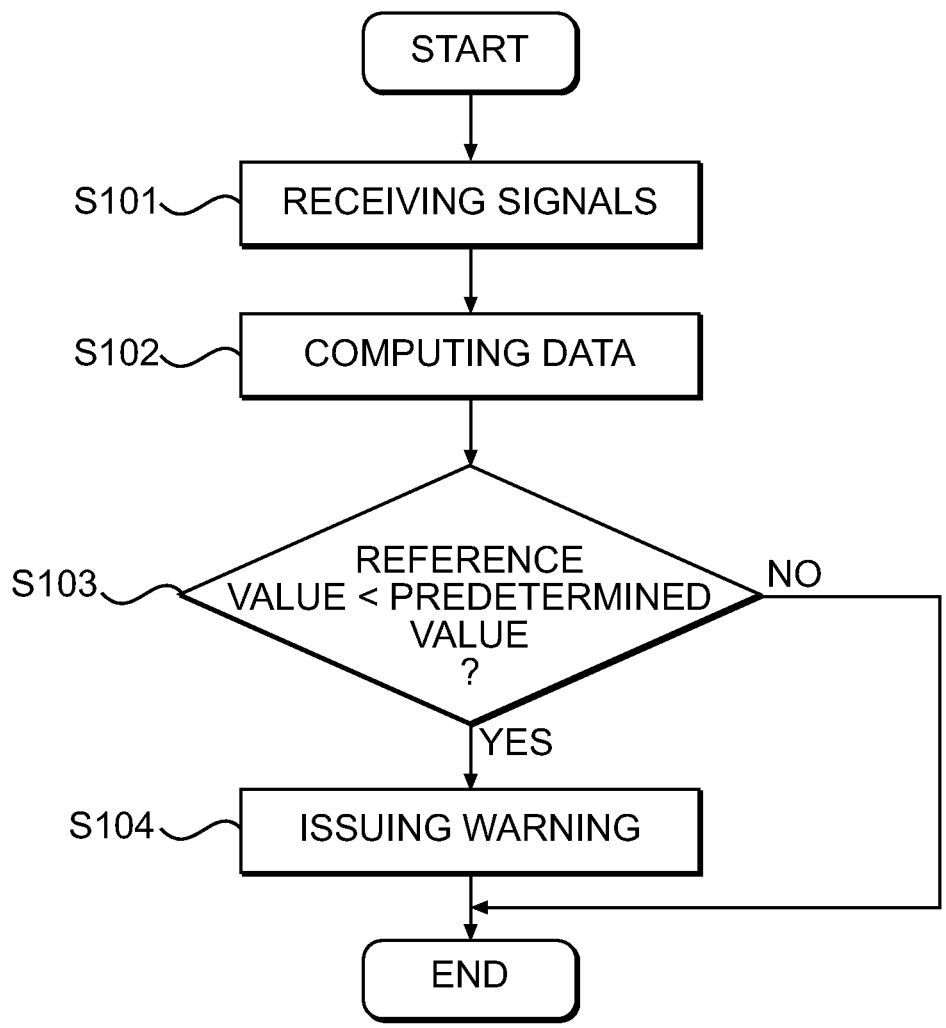
FIG. 2 is a flow chart that shows issuance of a warning if there is a traffic incident in a route to a destination desired by a driver.

FIG. 2 is a flow chart that shows issue of a warning if there is a traffic incident in a route to a destination desired by a driver. Upon receiving signals from the transceiver S101, the navigation unit computes data information stored in the received signals to yield a reference value S102. The computation S102 can be performed for the current velocity information data and/or the current positional information data of the sampling vehicles in the area. In step S102, the reference value can be derived from an average value of the current velocities of the sampling vehicles in the area; a lowest value among the current velocities of the sampling vehicles in the area; an average value of lowest n velocities among the current velocities of the sampling vehicles in the area; or any combination thereof. Alternatively, in step S102, the computation of the data information can be implemented to obtain the reference value that can be derived from an average value of distances between the sampling vehicles in the area; a lowest value among the distances between the sampling vehicles in the area; an average value of lowest n distances among the distances between the sampling vehicles in the area; or any combination thereof. The sampling vehicles can be sampled in such a way that the sampling vehicles do not include a stopped vehicle.

Then, the reference value obtained in step S102 is compared with a predetermined value, generally representing normal traffic flow in the route, which is calculated based on historical and/or statistical traffic data with regard to the route at that time. Here, the volume of relevant calculation can be kept under control. If the reference value is smaller than the predetermined value, the navigation unit issues a warning of a traffic incident in the area S104. As previously mentioned, the way of issuing the warning can be a visual symbol, an alarming sound, a vibration, a voice notification, or any combination thereof. On the other hand, if the reference value is equal to or greater than the predetermined value, the navigation unit does not issue the warning.

Figure 3A:
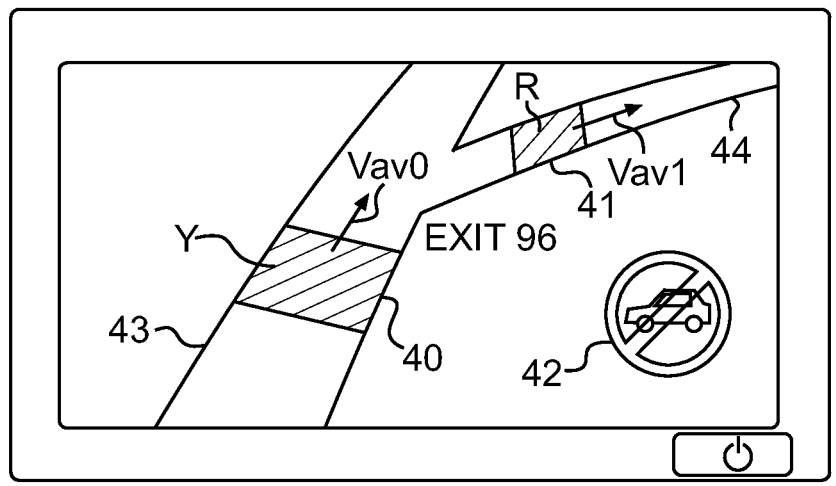
FIG. 3A shows a navigation unit in accordance with the subject matter, which displays an area with a single color based on an average velocity of sampling vehicles.

FIG. 3A shows a navigation unit in accordance with the subject matter, which displays an area with a single color based on an average velocity of sampling vehicles. On the display of the navigation unit, a first slow area 40 in a main road 43, in which the sampling vehicles are slower than normal due to traffic congestion, is indicated as solid Yellow Y. In the first slow area 40, the average speed of the sampling vehicles in the area 40 is Vav0. Also, there is a second slow area 41 in another road 44 bifurcated from the main road 43, in which the sampling vehicles are significantly slower than normal because of a traffic accident. The second slow area 41 is indicated with solid Red R as the average speed Vav1 of the sampling vehicles in the second slow area 41 is even lower than that Vav0 of the first slow area 40. In general, if average velocity of the sampling vehicles in the area in consideration is smaller than a predetermined value that is determined based on a normal velocity in the area at that time, the navigation unit can issue a warning such as a visual symbol 42. The visual symbol 42 advises the driver not to enter the branch road 44 within a predefined time. In lieu of or with the visual symbol 42, an alarming sound, a vibration, a voice notification, or any combination thereof can be used.

Figure 3B:
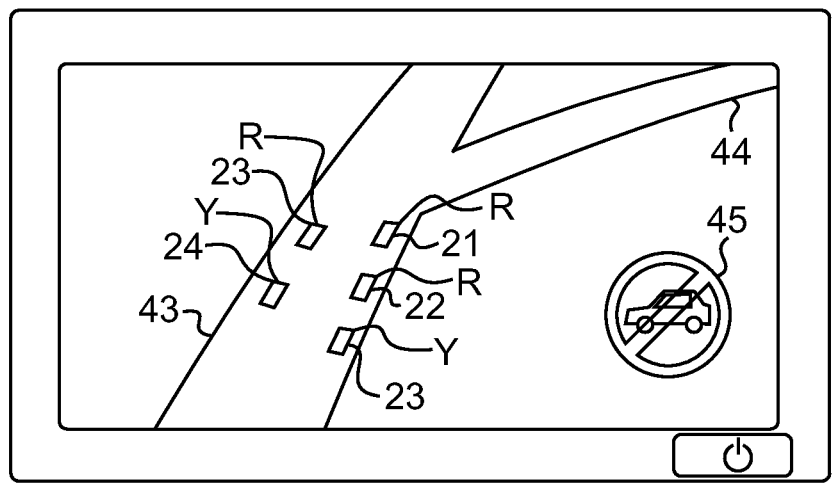
FIG. 3B shows the navigation unit that displays the sampling vehicles with visual objects of different colors depending upon a speed zone to which each vehicle belongs.

FIG. 3B shows a navigation unit that displays the sampling vehicles with visual objects of different colors depending upon a speed zone to which each vehicle belongs. In FIG. 3B, the navigation unit can display the sampling vehicles separately with different colors as schematically shown. The sampling vehicles are indicated with separate visual objects having different colors. Each visual object can be a graphic indicator displayed by the navigation unit and represents corresponding sampling vehicle. A color of each sampling vehicle is determined by a speed zone to which the sampling vehicle belongs. For example, any two sampling vehicles have a same color if they belong to a same speed zone while two vehicles have different colors if they belong to different speed zones. Speed zones can be determined in consideration of the speed limit and/or normal velocity of cars in the area, a predefined minimum velocity, etc. Alternatively, each speed zone can have a fixed speed range, e.g., 5, 10, 15, or 20 MPH.

Figure 4:
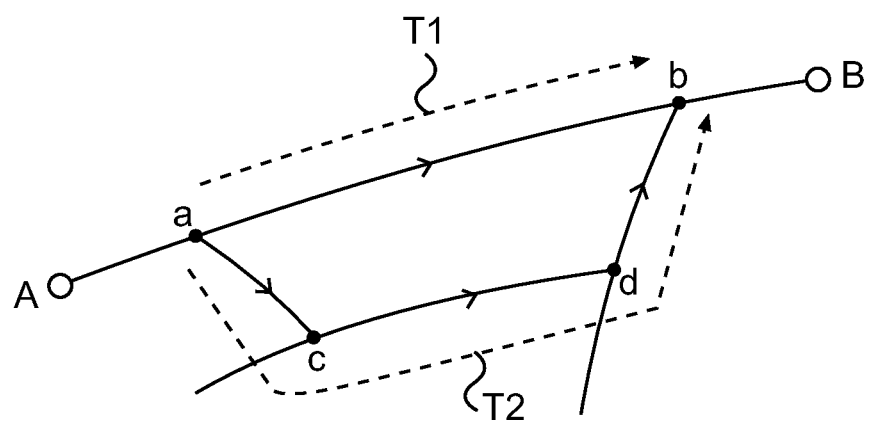
FIG. 4 shows a primary route to a desired destination computed based on statistical data stored in the navigation unit, and an alternative route to the destination computed based on both the statistical data stored in the navigation unit and real-time traffic data obtained from a transceiver.

FIG. 4 shows a primary route to a desired destination computed based on statistical data stored in the navigation unit, and an alternative route to the destination computed based on both the statistical data stored in the navigation unit and real-time traffic data obtained from a transceiver. A driver begins a car trip from a start point A to a destination point B. In a route to the destination B, which is calculated by the navigation unit based on historical and/or statistical data of the traffic between the start point A and the destination point B, a road segment from a first point a to a second point b ("segment a-b") is a region in consideration. In a normal traffic condition, the segment a-b would be a shortest-time route between the points a, b. However, if a traffic incident such as car accident or traffic congestion occurs on the segment a-b, making a detour may be a faster way to the point b. According to an embodiment of the subject matter, the navigation unit can calculate a shortest-time route using not only the historical and/or statistical data with regard to the route to the desired destination, which is already stored in the navigation unit, but also the real-time traffic data obtained from the transceiver. If an estimated travel time T1 along the segment a-b, in which the incident occurred, is equal to or greater than the corresponding time T2 along an alternative route between the points a, b, composed of three segments a-c, c-d, and d-b, the navigation unit recommends this alternative route to the driver. The estimation of travel time will be implemented by the navigation unit throughout all of the traffic segments between the start point A and the destination point B using both of the stored data and the real-time data.

Figure 5A:
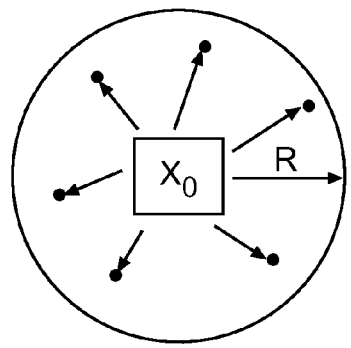
FIGS. 5A-5D show non-limiting exemplary navigation methods.

FIGS. 5A-5D illustrate exemplary navigation methods. Specifically, these embodiments illustrate exemplary methods of identifying at least one location of interest. FIG. 5A shows an exemplary embodiment of known navigation systems. In the system shown in FIG. 5A, a user selects a destination or a category of desired destination, and the system identifies at least one location of interest. These systems, however, merely provide a listing of all locations within a certain radius, without regard to a desired endpoint. Thus in these systems, the closest location could actually be behind the user, in the opposite direction of the desired endpoint, making such suggestions undesirable.

Figure 5B:
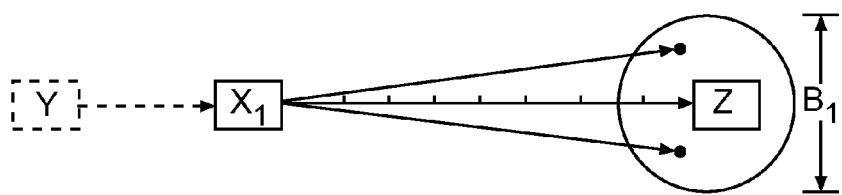
Figure 5C:
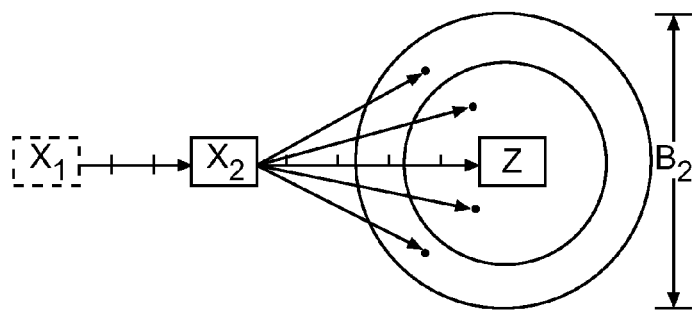
Figure 5D:
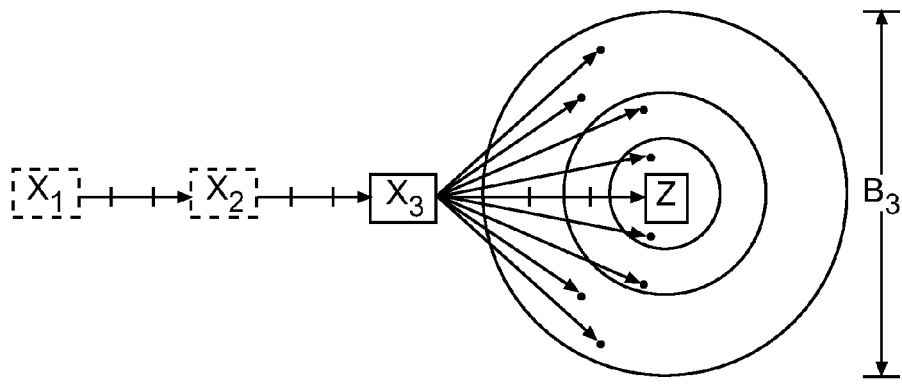

If a destination is known, however (i.e., the endpoint is known), a vector can be created using current position and velocity information, as shown in FIGS. 5B-5D. In these embodiments, the navigation system excludes locations that are not between the user's current location and the desired endpoint, or locations that are inaccessible or obstructed due to traffic, construction, weather, or road hazards, or other conditions. Initially, as shown in FIG. 5B, the system designates a first sampling bandwidth along the vector to the endpoint, and identifies locations of interest within the bandwidth. Optionally, as the user draws closer to the endpoint, the system designates additional bandwidths of greater width, and identifies locations of interest within these wider bandwidths, as shown in FIGS. 5C and 5D.

Figure 6:
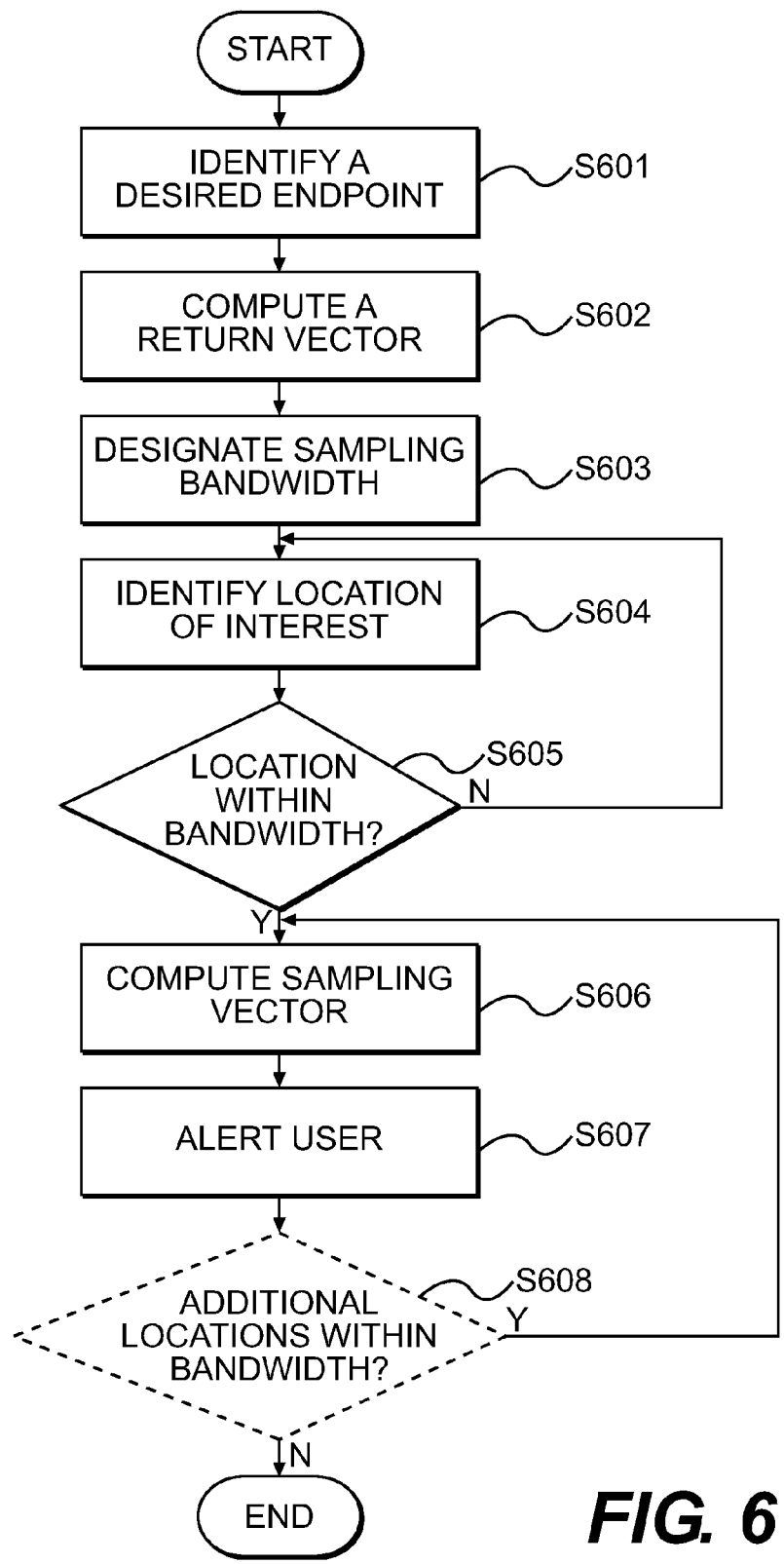
FIG. 6 shows a non-limiting exemplary method of identifying at least one location of interest between a user and an identified endpoint.

FIG. 6 illustrates a non-limiting exemplary method of identifying at least one location of interest between a user and an identified endpoint. In the embodiment of FIG. 6, a desired endpoint is identified S601. A reference vector is then computed based on current positional information, current velocity information, and an identified endpoint S602. These computations can be performed by a navigation unit within the motor vehicle, by a unit external to the motor vehicle, or some combination of the two. In the embodiment of FIG. 6, these computations are performed by a navigation unit within the motor vehicle. In step S603, the system designates a sampling bandwidth based on at least one of current velocity information, current positional information, and current distance to the identified endpoint. The sampling bandwidth can be predetermined, selected by the user, or a combination of the two. The sampling bandwidth can remain constant, or it may change with distance to the endpoint. Sampling bandwidth may also be determined based on the number of potential locations of interest within a certain distance, the time of day, the route travelled, or other factors of interest to the user.

In the exemplary embodiment of FIG. 6, bandwidth increases as the user approaches the endpoint. In this embodiment, the system designates an initial bandwidth S603. Optionally, as the user approaches the desired endpoint, the system identifies additional locations of interest within increasingly larger bandwidths as the user draws nearer to the desired endpoint. In this embodiment, only one sampling bandwidth need be established. In this embodiment, the system identifies one or more locations interest between the user and the indentified endpoint, S604. Locations of interest can be selected from one or more categories chosen by a user, and/or they can be selected from a database of user preferences. These preferences can be entered by the user, or they can be based upon locations of interest previously selected by the user. In certain embodiments, the system identifies locations of interest based on one or more of previous selections made by the user within the same or similar geographic region or area, selections made by the user within a certain time period, selections made by the user in a similar geographic area, and choices made by one or more other users having user profiles similar to the current user. These user profiles can be stored, for example, in a database within the navigation unit, or they may be accessed remotely.

In step S605, the system checks whether the location is within the sampling bandwidth. If a location of interest is within the sampling bandwidth, the system computes a sampling vector for at least one of the one or more locations of interest within the sampling bandwidth S606 and alerts the user to at least one of the one or more of the sampling vectors to the one or more locations of interest within the sampling bandwidth S607. In certain embodiments, the sampling vector is based on at least one value selected from the group consisting of an average value of the one or more sampling vectors to the one or more locations of interest within the sampling bandwidth, a lowest value among the sampling vectors to the one or more locations of interest within the sampling bandwidth, and an average value of the lowest n sampling vectors to the one or more locations of interest with the sampling bandwidth. In certain embodiments, the system excludes locations that may be between the user and the desired endpoint, but are inaccessible. An example would be excluding any locations that are not accessible from the side of the highway the user is travelling on. In these embodiments, positive velocities are associated with a first group of sampling vectors in a same traffic direction as the user vehicle in two-way traffic, and negative velocities are associated with a second group of sampling vectors in an opposite traffic direction as the user vehicle in the two-way traffic. In these embodiments, current positional information includes positive positions associated with the first group of the sampling vectors and negative positions associated with the second group of the sampling vectors. Computation of the one or more sampling vectors is based upon at least one of the current velocity information and the current positional information, with locations of interest having negative velocity or position values being excluded from calculations of vectors to locations of interest. In still other embodiments, only sampling vectors that are within a predetermined magnitude of the reference vector magnitude are identified to the user.

In still other exemplary embodiments, sample vectors having a magnitude within a first predetermined magnitude of a reference vector magnitude can be displayed with a first visual object of a first type, while sample vectors having a magnitude within a second predetermined magnitude of the reference vector magnitude can be displayed with a second visual object of a second type. If desired, the system can be programmed to repeats steps S602 to S608 until a desired number of locations of interest within the sampling bandwidth have been identified, or there are no additional locations of interest within the sampling bandwidth.

Figure 7:
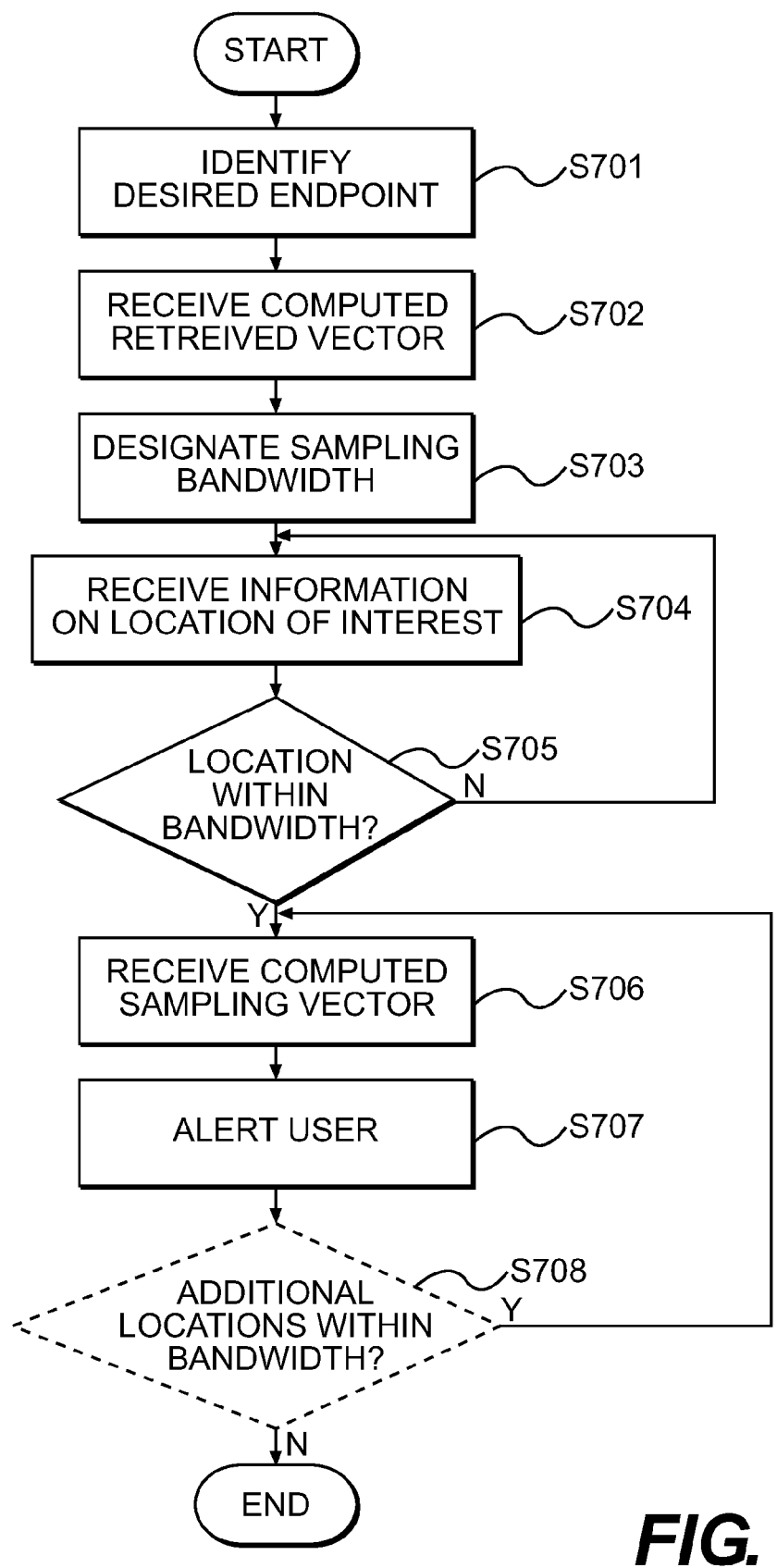
FIG. 7 shows a non-limiting exemplary method of identifying at least one location of interest between a user and an identified endpoint wherein at least a portion of the calculations are accomplished external to the motor vehicle.

FIG. 7 illustrates a non-limiting exemplary method of identifying at least one location of interest between a user and an identified endpoint wherein at least a portion of the calculations are accomplished external to the motor vehicle. In this exemplary method, at least a portion of the vector information is calculated remotely in, for example, a server, or computer. This remotely calculated information is transmitted to the user. In certain embodiments, a portion of the navigation system according to the present subject matter is contained in a hand-held wireless device. In these exemplary embodiments, one or more of the data processing and route planning previously executed at the signal transceiver are transferred to an Internet server database. At least a portion of the processing data and computation resides on a server. These hand-held devices can use, for example, wireless application protocols (WAP). Naturally, the WAP protocol requires adaptation of the communication modules and server applications, and/or interface with Guidance System Mobile (GSM)-based mobile phone development to enable the transfer of position information within reasonable degree of accuracy. By accessing this data, the Internet server maintains one or more databases and can process requests in real time. Calculated vectors are transferred via Internet/WAP application code to the user. Due to the size limitations of the cell-phone LCD displays, certain embodiments include an independent on-vehicle A/V color monitor with full connection capabilities to the cell-phone. It should be noted that in this refinement any client vehicle with a cell-phone can function as a sample vehicle.

In the exemplary embodiment of FIG. 7, a desired endpoint is identified S701. The system receives a computed reference vector based on current positional information, current velocity information, and an identified endpoint S702. At least a portion of these computations are performed by a navigation unit external to the motor vehicle. In step S703, the system designates a sampling bandwidth based on at least one of current velocity information, current positional information, and current distance to the identified endpoint. The sampling bandwidth can be predetermined, selected by the user, or a combination of the two. The sampling bandwidth can remain constant, or it may change with distance to the endpoint. Sampling bandwidth may also be determined based on the number of potential locations of interest within a certain distance, the time of day, the route travelled, or other factors of interest to the user.

In the exemplary embodiment of FIG. 7, bandwidth optionally increases as the user approaches the endpoint. In this optional embodiment, as the user approaches the desired endpoint, the system identifies additional locations of interest within increasingly larger bandwidths as the user draws nearer to the desired endpoint. In this embodiment, only one sampling bandwidth need be established. In this embodiment, the system receives a signal including information on one or more locations interest between the user and the indentified endpoint, S704. Locations of interest can be selected from one or more categories chosen by a user, and/or they can be selected from a database of user preferences. These preferences can be entered by the user, or they can be based upon locations of interest previously selected by the user. In certain embodiments, the system identifies locations of interest based on one or more of previous selections made by the user within the same or similar geographic region or area, selections made by the user within a certain time period, selections made by the user in a similar geographic area, and choices made by one or more other users having user profiles similar to the current user.

In step S705, the system checks whether the location is within the sampling bandwidth. If a location of interest is within the sampling bandwidth, the system receives a signal containing a computed sampling vector for at least one of the one or more locations of interest within the sampling bandwidth S706, and alerts the user to at least one of the one or more of the sampling vectors to the one or more locations of interest within the sampling bandwidth S707. In certain embodiments, the sampling vector is based on at least one value selected from the group consisting of an average value of the one or more sampling vectors to the one or more locations of interest within the sampling bandwidth, a lowest value among the sampling vectors to the one or more locations of interest within the sampling bandwidth, and an average value of the lowest n sampling vectors to the one or more locations of interest with the sampling bandwidth. In certain embodiments, the system excludes locations that may be between the user and the desired endpoint, but are inaccessible. An example would be excluding any locations that are not accessible from the side of the highway the user is travelling on. In these embodiments, positive velocities are associated with a first group of sampling vectors in a same traffic direction as the user vehicle in two-way traffic, and negative velocities are associated with a second group of sampling vectors in an opposite traffic direction as the user vehicle in the two-way traffic. In these embodiments, current positional information includes positive positions associated with the first group of the sampling vectors and negative positions associated with the second group of the sampling vectors. Computation of the one or more sampling vectors is based upon at least one of the current velocity information and the current positional information, with locations of interest having negative velocity or position values being excluded from calculations of vectors to locations of interest. In still other embodiments, only sampling vectors that are within a predetermined magnitude of the reference vector magnitude are identified to the user.

In still other exemplary embodiments, sample vectors having a magnitude within a first predetermined magnitude of a reference vector magnitude can be displayed with a first visual object of a first type, while sample vectors having a magnitude within a second predetermined magnitude of the reference vector magnitude can be displayed with a second visual object of a second type. If desired, the system can be programmed to repeats steps S702 to S708 until a desired number of locations of interest within the sampling bandwidth have been identified, or there are no additional locations of interest within the sampling bandwidth.

Figure 8:
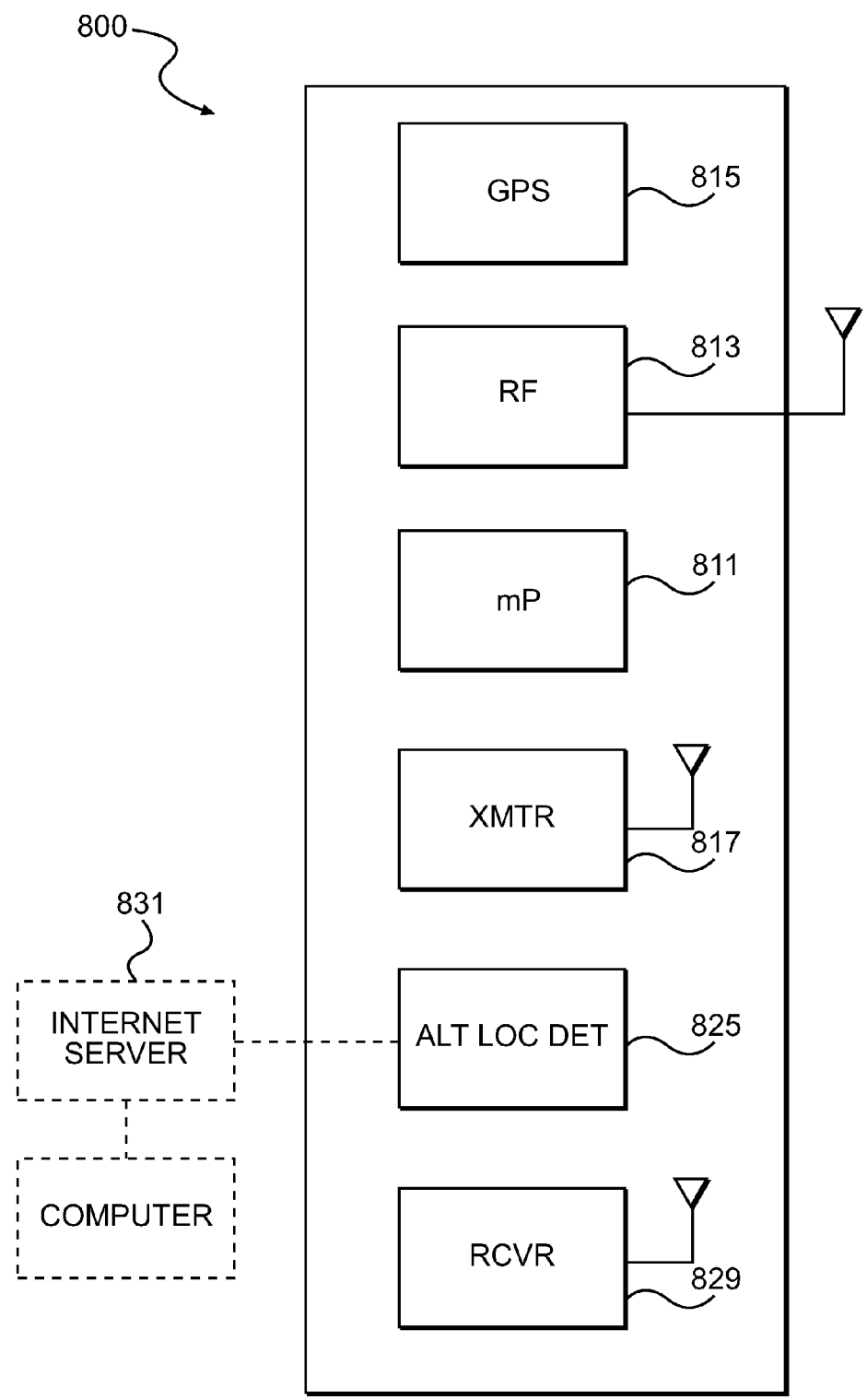
FIG. 8 shows a non-limiting exemplary navigation system in accordance with the present subject matter.

FIG. 8 shows an exemplary navigation system 800 in accordance with the present subject matter. The system includes a processor 811, an air interface 813 used for wireless communication, a geolocation circuit such as a GPS 815 and a transmitter 817. Additional circuits may include an auxiliary location detector 825, and an auxiliary interface 829, configured to receive inputs from an Internet Server 831. Auxiliary location detector 825 may be an instrument such a motion detector, accelerometer, gyroscopic rate sensor, a compass device, an inertial navigation sensor, or a combination of these. This enables the navigation system 800 to calculate its position even if GPS is unavailable, or if additional location information is desired (hybrid position information, for example). These hybrid position inputs can be derived from, for example, cell tower signals, wireless internet signals, Bluetooth sensors or other local Positioning Systems. These inputs are specifically designed to overcome the limitations of GPS, which sometimes works poorly between tall buildings. By comparison, cell tower signals are not hindered by buildings or bad weather, but usually provide less precise positioning. Wi-Fi signals may give very exact positioning, but typically only in urban areas with high Wi-Fi density, and depend on a comprehensive database of Wi-Fi access points. The auxiliary interface 829 is configured to receive inputs from Internet server 831, which is used in embodiments wherein at least a portion of the location and/or vector calculations are accomplished external to the motor vehicle, and may be connected to a computer. Interface 829 may also receive inputs from other users, information regarding locations that locations that are inaccessible or obstructed due to traffic, construction, weather, or road hazards, and other conditions.

This system configuration is exemplary only, and not limited to what is shown. Although the subject matter has been described with reference to the illustrated embodiment, the subject matter is not limited thereto. The subject matter being thus described, it will be obvious that the same may be varied in many ways. Such variations are not to be regarded as a departure from the spirit and scope of the subject matter, and all such modifications as would be obvious to one skilled in the art are intended to be included within the scope of the following claims.

What is claimed is:

1. A method of identifying a location of interest between a user and an identified endpoint, comprising:
   creating a user preference profile containing at least one location of interest to the user;
   designating, by a navigation unit, a sampling bandwidth based on the user's current distance to the identified endpoint, wherein the navigation unit dynamically expands the sampling bandwidth as the user approaches within a predetermined distance of the identified endpoint;
   selecting, by the navigation unit, at least one user preference profile location of interest within the sampling bandwidth that is between the user and the identified endpoint;
   computing a sampling vector for the at least one location of interest within the sampling bandwidth; and
   alerting the user to the sampling vector for the at least one location of interest within the sampling bandwidth.

2. The method of claim 1, wherein a size of the sampling bandwidth is based on at least one factor selected from the group consisting of:
   a number of potential locations of interest within a certain distance of the user's current location;
   a time of day;
   a route travelled by the user; and
   at least one preference entered by the user.

3. The method of claim 1, wherein the user preference profile is created using information selected from the group consisting of:
   at least one location of interest previously selected by the user;
   at least one location of interest previously selected by another user in a geographic region similar to the user's geographic region; and
   at least one location of interest selected by another user having a user preference profile similar to the current user.

4. The method of claim 1, wherein the user preference profile locations of interest are stored in a database.

5. The method according to claim 1, wherein the sampling vector is based on at least, one value selected from the group consisting of:
   an average value of sampling, vehicle vectors to the at least one locations of interest within the sampling bandwidth;
   a lowest value among the sampling vehicle vectors to the one or more locations of interest within the sampling bandwidth; and
   an average value of the lowest n sampling vehicle vectors to the one or more locations of interest with the sampling bandwidth.

6. The method according to claim 1, wherein:
   positive velocities are associated with a first group of sampling vehicle vectors in a same traffic direction as a user vehicle in two-way traffic and negative velocities are associated with a second group of sampling vehicle vectors in an opposite traffic direction as the user vehicle in the two-way traffic,
   the user's current positional information includes positive positions associated with the first group of the sampling vehicle vectors and negative positions associated with the second group of the sampling vehicle vectors, and
   the computation of the sampling vector by the navigation unit is based upon at least one of the user's current velocity information and the user's current positional information and excludes the negative velocities and the negative positions.

7. The method of claim 1, wherein the sampling vector is only identified to the user if it is within a predetermined magnitude of a reference vector magnitude.

8. The method of claim 7, further comprising:
   displaying the sampling vector with a first visual object of a first type if it has a magnitude within a first predetermined magnitude of the reference vector magnitude; and
   displaying the sampling vector with a second visual object of a second type if it has a magnitude within a second predetermined magnitude of the reference vector magnitude.

9. The method of claim 1, further comprising excluding locations of interest between the user and the identified endpoint that are obstructed due to traffic, construction, weather, or road hazards.

10. The method of claim 1, wherein the at least one user preference profile location of interest is selected from the group consisting of a hotel, a restaurant, a gas station, an airport, a store, a mall, a park, a museum, a market, a theater, a train station, and a port.

11. A method of identifying a location of interest between a user and an identified endpoint, comprising:
   receiving a user preference profile containing at least one location of interest to the user;
   designating, by a navigation unit, a sampling bandwidth based on the user's current distance to the identified endpoint, wherein the navigation unit dynamically expands the sampling bandwidth as the user approaches within a predetermined distance of the identified endpoint;
   receiving a signal including at least one user preference profile location of interest within the sampling bandwidth that is between the user and the identified endpoint;
   receiving a computed sampling vector for one or more of the at least one locations of interest within the sampling bandwidth; and
   alerting the user to the sampling vector for the at least one location of interest within the sampling bandwidth.

12. The method of claim 11, wherein a size of the sampling bandwidth is based on at least one factor selected from the group consisting of:

a number of potential locations of interest within a certain distance of the user's current location;
a time of day;
a route travelled by the user; and
at least one preference entered by the user.

13. The method of claim 11, wherein the user preference profile is created using information selected from the group consisting of:
at least one location of interest previously selected by the user;
at least one location of interest previously selected by another user in a geographic region similar to the user's geographic region; and
at least one location of interest selected by another user having a user preference profile similar to the current user.

14. The method of claim 11, wherein the user preference profile locations of interest are stored in a database.

15. The method according to, claim 11, wherein the sampling vector is based on at least one value selected from the group consisting of:
an average value of sampling vehicle vectors to the one or more locations of interest within the sampling bandwidth;
a lowest value among the sampling vehicle vectors to the at least one, locations of interest within the sampling bandwidth; and
an average value of the lowest n sampling vehicle vectors to the one or more locations of interest with the sampling bandwidth.

16. The method according to claim 11, wherein:
positive velocities are associated with a first group of sampling vehicle vectors in a same traffic direction as a user vehicle in two-way traffic and negative velocities are associated with a second group of sampling vehicle vectors in an opposite traffic direction as the user vehicle in the two-way traffic,
the user's current positional information includes positive positions associated with the first group of the sampling vehicle vectors and negative positions associated with the second group of the sampling vehicle vectors, and
the computation of the sampling vector by the navigation unit is based upon at least one of the user's current velocity information and the user's current positional information and excludes the negative velocities and the negative positions.

17. The method of claim 11, wherein the sampling vector is only identified to the user if it is within a predetermined magnitude of a reference vector'magnitude.

18. The method of claim 17, further comprising:
displaying the sampling vector with a first visual object of a first type if it has a magnitude within a first predetermined magnitude of the reference vector magnitude, and
displaying the sampling vector with a second visual object of a second type if it has a magnitude within a second predetermined magnitude of the reference vector magnitude.

19. The method of claim 11, further comprising excluding locations of interest between the user and the identified endpoint that are obstructed due to traffic, construction, weather, or road hazards.

20. The method of claim 11, wherein the at least one user preference profile location of interest is selected from the group consisting of a hotel, a restaurant, a gas station, an airport, a store, a mall, a park, a museum, a market, a theater, a train station, and a port.

21. A motor vehicle navigation system, comprising:
a navigation unit connected to a motor vehicle, the navigation unit containing a non-transitory computer-readable medium that stores data for implementing:
creating a user preference profile containing at least one location of interest to the user;
designating, by the navigation unit, a sampling bandwidth based on the user's current distance to an identified endpoint, wherein the navigation unit dynamically expands the sampling bandwidth as the user approaches within a predetermined distance of the identified endpoint;
selecting, by the navigation unit, at least one user preference profile of interest within the sampling bandwidth that is between the user and the identified endpoint;
computing a sampling vector for one or more, of the at least one locations of interest within the sampling bandwidth; and
alerting the user to the sampling vector for the at least one location of interest within the sampling bandwidth.

22. A motor vehicle navigation system, comprising:
a navigation unit connected to a motor vehicle, the navigation unit containing a non-transitory computer-readable medium that stores data for implementing:
receiving a user preference profile containing at least one location of interest to the user;
designating, by the navigation unit, a sampling bandwidth based on the user's current distance to an identified endpoint, wherein the navigation unit dynamically expands the sampling bandwidth as the user approaches within a predetermined distance of the identified endpoint;
receiving a signal including at least one user preference profile of interest within the sampling bandwidth that is between the user and the identified endpoint;
receiving a computed sampling vector for one or more of the at least one locations of interest within the sampling bandwidth; and
alerting the user to the sampling vector for the at least one location of interest within the sampling bandwidth.

* * * * *